(12) United States Patent
Thompson et al.

(10) Patent No.: US 9,134,910 B2
(45) Date of Patent: Sep. 15, 2015

(54) SET HEAD FLAG OF REQUEST (71) Applicant: Hewlett-Packard Development Company, L.P., Fort Collins, CO (US)

(72) Inventors: Mark J. Thompson, Spring, TX (US); Timothy W J Majni, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 13/874,344

(22) Filed: Apr. 30, 2013

(65) Prior Publication Data
US 2014/0325164 A1    Oct. 30, 2014

(51) Int. Cl.
*G06F 12/00*    (2006.01)
*G06F 3/06*    (2006.01)
(52) U.S. Cl.
CPC ............ *G06F 3/0611* (2013.01); *G06F 3/0659* (2013.01); *G06F 3/0673* (2013.01); *G06F 3/067* (2013.01)
(58) Field of Classification Search
None
See application file for complete search history.

(56) References Cited

U.S. PATENT DOCUMENTS

| 6,297,087 | B1* | 10/2001 | Koffler et al. ............... 438/243 |
| 6,487,628 | B1  | 11/2002 | Duong et al. |
| 6,631,440 | B2  | 10/2003 | Jenne et al. |
| 6,970,978 | B1  | 11/2005 | Wu |
| 7,506,084 | B2  | 3/2009  | Moerti et al. |
| 7,761,669 | B2  | 7/2010  | Allison et al. |
| 8,296,480 | B2  | 10/2012 | Noeldner et al. |
| 8,595,444 | B2* | 11/2013 | Aronovich et al. ........... 711/137 |

OTHER PUBLICATIONS

Adaptec 3Gb/s SATA & SAS RAID Family with Intelligent Power Management 2045, 2405, 2805, (Research Paper).
Speeding Data Access with the Sun Flash Accelerator F20 PCIe Card, (Research Paper), Jun. 2010.

* cited by examiner

*Primary Examiner* — Brian Peugh
(74) *Attorney, Agent, or Firm* — Hewlett-Packard Patent Department (57) ABSTRACT

A request is output to a first queue of a storage device. A head flag of the request is set based on whether the request is a read type request and a comparison of a percentage of requests queued at the first queue that are read type requests to a threshold percentage. The storage device is to store the request at a head of the first queue if the head flag of the request is set.

15 Claims, 4 Drawing Sheets

SET HEAD FLAG OF REQUEST

BACKGROUND

Storage device controllers may receive a request from a host, such as a read request or a write request, and output the request to the storage device. The storage device may receive and queue up a plurality of the received requests. Thus, there may be a latency for processing the read and write requests.

BRIEF DESCRIPTION OF THE DRAWINGS

The following detailed description references the drawings, wherein.

DETAILED DESCRIPTION

Specific details are given in the following description to provide an understanding of examples of the present techniques. However, it will be understood that examples of the present techniques may be practiced without these specific details. For example, systems may be shown in block diagrams in order not to obscure examples of the present techniques in unnecessary detail. In other instances, well-known processes, structures and techniques may be shown without unnecessary detail in order to avoid obscuring the examples of the present techniques.

In many cases, read latency may be more important to a host (or user at the host) than write latency. Read latency may refer to an amount of time consumed by a storage device to process a read request of the host and write latency may refer to an amount of time consumed by a storage device to process a write request of the host. This is generally because the host may wait for the read data to arrive, whereas the host may rarely wait after the write request is sent because the write request is usually cached in an operating system (OS) of the host and/or a memory of storage device controller that interfaces between the storage device and the host.

Storage devices may prioritize write requests over read requests. Thus, if a plurality of write requests, such as 10, are outstanding to the storage device, a pending read request will often be deferred, such as by a second or more, as the storage device prioritizes the plurality of incoming write requests ahead of the single waiting read request.

Further, there may be no suitable Small Computer System Interface (SCSI) task attribute to reduce the read latency. Also, "Ordered" queuing may cause an unacceptably large drop in performance due to missed revolutions for a drive of the storage device. Moreover, constricting queue depths would also cause a substantially large reduction in random Input/output processes (IOPs).

Examples of present techniques may improve read request latency without substantially affecting write request latency. For example, a device may include an interface unit and a controller. The interface unit may receive a first request from a host. The controller may output the first request to a first queue of a storage device. The controller may set a head flag of the first request if the first request is a read type request and a percentage of requests queued at the first queue that are read type requests is less than a threshold percentage. The storage device may store the first request at a head of the first queue if the head flag of the first request is set. Thus, examples may allow for read requests to be prioritized over write requests when a percentage of the outstanding requests that are read requests is below a threshold percentage.

Figure 1:
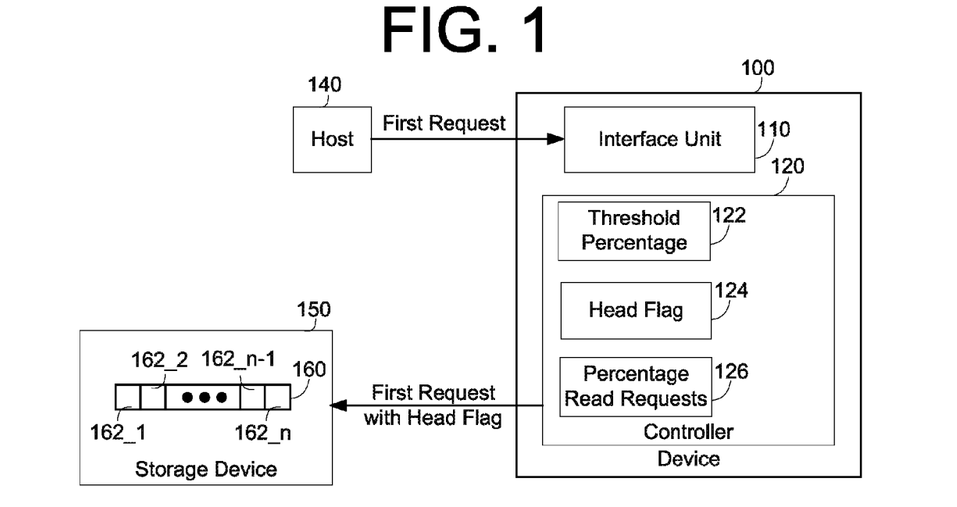
FIG. 1 is an example block diagram of a device to set a head flag of a request to a storage device.

Referring now to the drawings, FIG. 1 is an example block diagram of a device 100 to set a head flag 124 of a request to a storage device 150. The device 100 may couple to or be included in any type of computing device or controller that interfaces with a memory, such as a secure microprocessor, a storage device controller, a notebook computer, a desktop computer, an all-in-one system, a server, a network device, a wireless device and the like. In the example of FIG. 1, device 100 interfaces with a host 140 and the storage device 150. For example, the device 100 may communicate with the storage device 150 via a Serial Attached SCSI (SAS) connection and may communicate with the host 140 via a Peripheral Component Interconnect (PCI) connection, Ethernet or IP protocol connection.

The host 140 may refer to any type of device that seeks to access the storage device 150, such as a main processor of a computer or a computer connected to a computer network. The storage device 150 may be any electronic, magnetic, optical, or other physical storage device that stores data, such as a hard disk drive (HDD), solid-state drive (SSD) and the like. For example the storage device 150 may include one or more physical drives (not shown) and one or more logical data volumes spanning one or more of the drives.

In FIG. 1, the device 100 is shown to include an interface unit 110 and controller 120. The interface unit and controller 110 and 120 may include, for example, a hardware device including electronic circuitry for implementing the functionality described below, such as control logic and/or memory. In addition or as an alternative, the interface unit and controller 110 and 120 may be implemented as a series of instructions encoded on a machine-readable storage medium and executable by a processor.

The interface unit 110 may receive a first request from the host 140. For example, the first request may a read request requesting to read data from the storage device 150 or a write request requesting to write data to the storage device 150. The controller 120 may output the first request to a first queue 160 of the storage device 150. The first queue 160 may be a physical region of the storage device 150 used to temporarily store data while it is being moved from one place to another, e.g. from the device 100 to a disc or drive (not shown) of the storage device 150. The first queue 160 may have a type of data structure in order to arrange the a plurality of incoming requests, such as a First-In-First-Out (FIFO) data structure or a LBA-sorted Elevator Queue data structure. In FIG. 1, the first queue 160 may have a FIFO structure, with a request entering a tail 162-$n$ (where n is a natural number) of the first queue 160 and progressing towards a head 162-1 of the first queue 160, at which point the request may leave the first queue 160.

The controller 120 may set a head flag 124 of the first request if the first request is a read type request and a percentage of requests 126 queued at the first queue 160 that are read type requests is less than a threshold percentage 122. For example, the first request may be a packet including data (or payload) and control information, such as a header or trailer. The head flag 124 may be part of the control information, where the head flag 124 is already present in the control information of the first request when received by the device 100, and/or encapsulated therein when output by the controller 120 to the storage device 150.

The percentage of requests 126 queued at the first queue 160 that are read type requests may relate to a ratio or percentage of read requests to total requests outstanding at the first queue 160. For example, if there are a total of 3 read requests and 7 write requests stored at the first queue 160, the percentage of requests 126 queued at the first queue 160 that are read type requests may be 30%. A calculation for the percentage of requests 126 queued at the first queue 160 that are read type requests is explained in more detail below with respect to FIG. 2. The threshold percentage 122 may be determined, for example, empirically and/or according to an administrator's or user's preference. For instance, if the threshold percentage is 50% and the percentage of requests 126 queued at the first queue 160 that are read type requests is 30%, then the controller 120 will set the head flag 124 of the first request.

The controller may instead reset the head flag 124 of the first request if the percentage of requests queued at the first queue that are read type requests 126 is greater than or equal to the threshold percentage 122. The controller may also reset the head flag 124 of the first request, if the first request is not the read type request. Conversely, the head flag 124 may be reset by default. Therefore, the controller 120 may only selectively set the head flag 124 for the reasons described above. Resetting the head flag 124 may relate to writing a zero to a field of the control information of the first request and setting the head flag 124 may relate to writing a one to the same field of the first request, or vice versa.

The storage device 150 may store the first request at the head 162_1 of the first queue 160 if the head flag 124 of the first request is set. On the other hand, the storage device 150 may store the first request at a tail 162_n of the first queue 160 if the head flag 124 of the first request is reset. As explained above, the head 162_1 is processed next by storage device 150 and the tail 162_n is processed last by the storage device 150 from the requests stored at the first queue 160. For instance, if the first queue 160 includes a plurality of write requests, the first request that is a read request will be placed at the head 162_1 of the first queue 160 and thus processed before the plurality of write requests in the first queue 160.

Nonetheless, the storage device 150 may be free to rearrange requests within the first queue 160 that have the head flag 124 reset. For example, the storage device 150 may not process the requests in FIFO order but instead attempt to rearrange the requests that have the head flag reset, to optimize a number of requests-per-second that are processed. In one example, the requests may include an ordered queuing flag that prevents the requests from being rearranged, if the ordered queuing flag is set.

Figure 2:
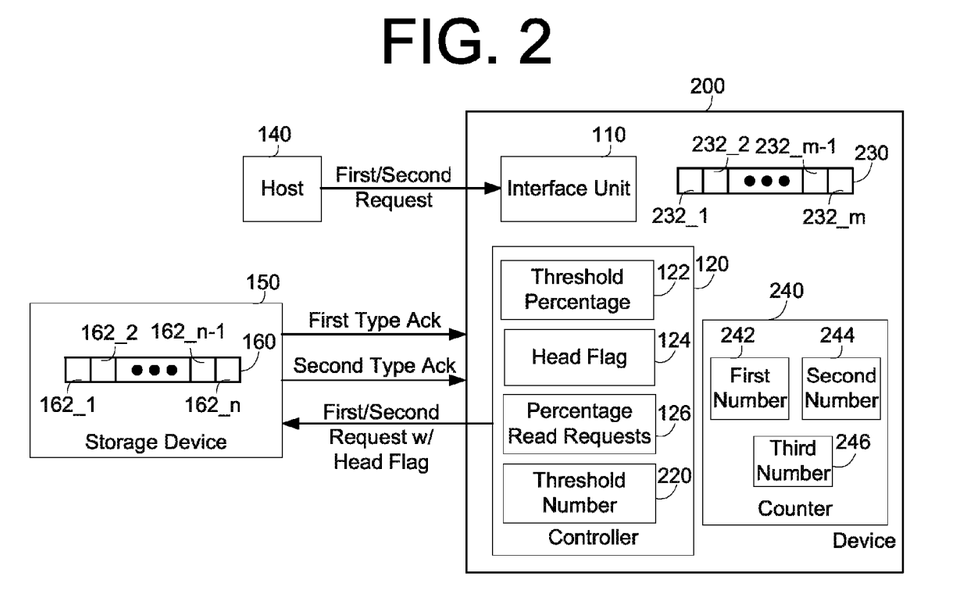
FIG. 2 is another example block diagram of a device to set a head flag of a request to a storage device.

FIG. 2 is another example block diagram of a device 200 to set a head flag 124 of a request to a storage device 150. The device 200 may couple to or be included in any type of computing device or controller that interfaces with a memory, such as a secure microprocessor, a storage device controller, a notebook computer, a desktop computer, an all-in-one system, a server, a network device, a wireless device and the like.

The device 200 of FIG. 2 may include at least the functionality and/or hardware of the device 100 of FIG. 1. For example, the device 200 of FIG. 2 includes the interface unit 110 and the controller 120 of the device 100 of FIG. 1. The device 200 further includes a second queue 230 and a counter 240. Similar to FIG. 1, the device 200 also interfaces with the host 140 and the storage device 150.

The counter unit 240 may include, for example, a hardware device including electronic circuitry for implementing the functionality described below, such as control logic and/or memory. In addition or as an alternative, the counter 240 may be implemented as a series of instructions encoded on a machine-readable storage medium and executable by a processor.

The second queue 230 may be a region of a physical memory storage area (not shown) of the device 200 used to temporarily store requests while being moved from one place to another, e.g. from the device 200 to the storage device 150. Similar to the second queue 160, the first queue 230 may have a type of data structure that allows for a plurality of incoming requests to be arranged in an ordered manner, such as the FIFO data structure.

The counter 240 may count a first number 242 of read type requests outstanding at the first queue 160 of the storage device 150. The counter 240 may also count a second number 244 of both read type and non-read type requests outstanding at the first queue 160 of the storage device 150. The percentage 126 of requests queued at the first queue 160 that are read type requests may be based on the first and second numbers 242 and 244. For example, assume the first number 242 is 3, indicating that 3 read requests are outstanding at the first queue 160, and the second number 244 is 10, indicating that a combination of 10 read and non-read (e.g. write) requests are outstanding at the first queue 160. The percentage 126 of requests queued at the first queue 160 that are read type requests may then be calculated based on a proportion between the first and second numbers 242 and 244, such as 3/10 or 30%.

The counter 240 may increment the first number 242 if the controller 120 outputs the read type request to the first queue 160 and may increment the second number 244 if the controller 120 outputs the read type request or the non-read type request to the storage device 150, such as the first queue 160. For example, assume the controller 120 outputs 1 read request, followed by 5 write requests, and then 1 read request. During this period, the counter 240 may increment the first number 242 twice (for the two 2 read requests) and increment the second number 244 seven times (for each of the read and write requests). Thus, if both the first and second numbers 242 and 244 were 0 before this period, the first and second numbers 242 and 244 would respectively be 2 and 7 after this period.

However, counter 240 may also decrement the first or second number 242 and 244 during this period or any other period. For example, the counter 240 may decrement the first number 242 if the storage device 150 outputs a first type acknowledgment to the device 200 and decrement the second number 244 if the storage device 150 outputs the first type acknowledgement or a second type acknowledgment to the device 200. The storage device 150 may output the first type acknowledgement to indicate that a read type request has left the first queue 160 and output the second type acknowledgment to indicate that a non-read type request has left the first queue 160.

The counter 240 may also a count a third number 246 that tallies a number of outstanding requests that have the head flag 124 set. For instance, the counter 240 may increment the third number 246 each time a request with the head flag 124 set is output by the device 200 to the storage device 150. Further, the counter 240 may decrement the third number 246 each time the storage device 150 outputs a third type acknowledgment. The storage device 150 may output the third type acknowledgment each time a request having the head flag 124 set leaves the first queue 160. In one example, the controller 120 may stop sending requests to the storage device 150, if the third number 246 reaches a threshold number 220, such as 2. Thus, in this case, the controller 120 may hold subsequent requests, such as at the second queue 230, until the number of outstanding requests with the head flag 124 set at the first queue 160 is less than the threshold number 220.

The controller 120 may receive and output a plurality of requests to the storage device 150. For example, the controller 120 may receive a second request from the host 140 after the first request. The controller 120 may output the second request to a tail 232_m (where m is a natural number) of the second queue 230 if the second request is not a read type request and the first queue 160 has capacity to store only one additional request. This is because if the controller 120 receives a request, sets the head flag 124 of that request and outputs that request to the storage device 150, the storage device 150 would be unable to move that request to the head 162_1 of the first queue 160 if the first queue 160 was already full. While FIG. 2 describes the controller 120 as only leaving space for one additional request at the first queue 160, embodiments of the controller 120 may leave space for more than request at the first queue 160. Thus, the controller 120 may hold back a non-read type request if the first queue 160 is at near capacity.

Further, the controller 120 may reset a head flag 124 of the second request and output the second request to the second queue 230 even when the second request is a read type request, if the percentage 126 of requests queued at the first queue 160 that are read type requests is greater than or equal to the threshold percentage 122 and the first queue 160 has capacity to store only one additional request. This is because an other request may still be received by the controller 120 when the percentage 126 of requests queued at the first queue 160 that are read type requests is less than the threshold percentage 122 and the first queue 160 still only has capacity to store only one additional request. In this case, as described above, the controller 120 would output the other request to the storage device 150 with its head flag 124 set.

In addition, the controller 120 may set the head flag 124 of the second request and output the second request to a head 230_1 of the second queue 230 if the second request is the read type request and the head 162_1 of the first queue 160 holds the first request that is the read type request. The controller 120 may then output the second request to the storage device 150 after the first request is output from the head 162_1 of the first queue 160 of the storage device 150, if the percentage 126 of requests queued at the first queue 160 that are read type requests is less than the threshold percentage 122.

The storage device 150 may store the second request at the head 162_1 of the first queue 160 if the head flag 124 of the second request is set and may store the second request at the tail 162_n of the first queue 160 if the head flag 124 of the second request is reset. Thus, a situation may be avoided where more than one request with the head flag 124 set is present within the first queue 160. Otherwise, requests may be processed out-of-order, such as if a newer request with the head flag 124 set was placed ahead of an older request with the head flag 124 set. The controller 120 may be able to determine whether there is more than one request with the head flag 124 set based on the third number 246.

Figure 3A:
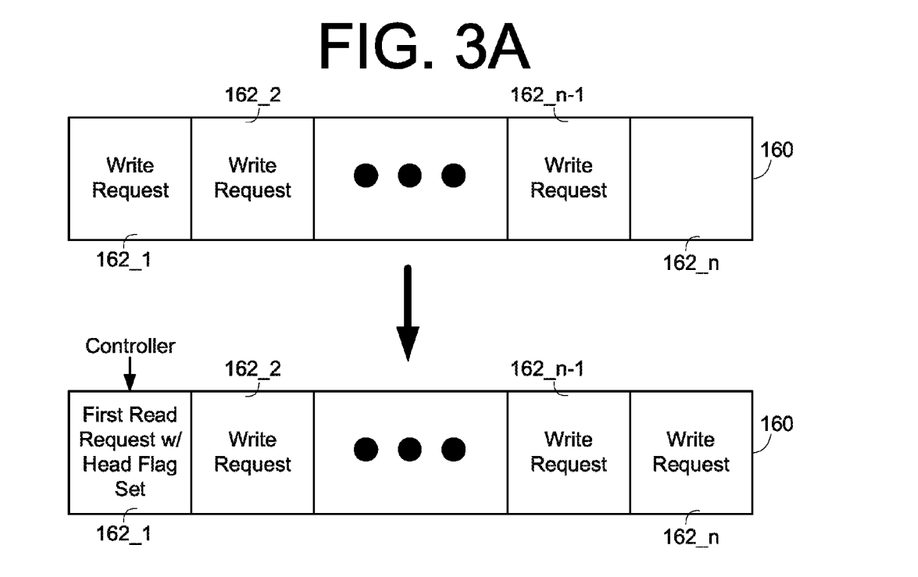
FIGS. 3A and 3B are example block diagrams of the first and second queues of FIG. 2.
Figure 3B:
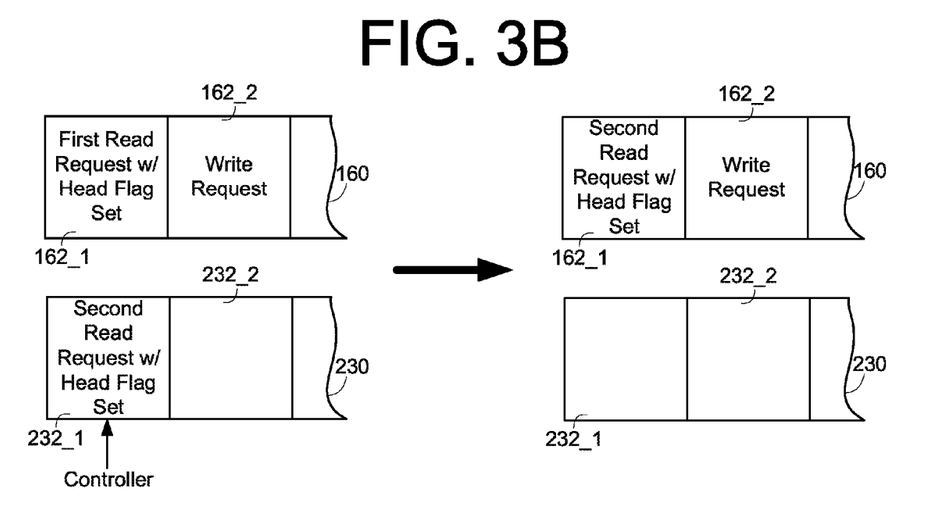

FIGS. 3A and 3B are example block diagrams of the first and second queues 160 and 230 of FIG. 2. In FIG. 3A, the first queue 160 is shown to initially include only a plurality of write requests 162_2 to 162_n-1, with a last spot 162_n of the first queue 160 empty, so that the first queue 160 may have room to store an incoming read request. Then, the first request (which is a read type request) with its head flag set is shown to be output by the controller 120 and stored at a head 162_1 of the first queue 160. As a result, all the write requests are shifted back one spot so that the write request previously at the head 162_1 is now at a second spot 162_2 and the last spot 162_n is now filled with the write request that was previously at the next to last spot 162_n-1. Hence, as a result of the setting the head flag of the first request, the first request will be processed before all the write requests. Otherwise, if the head flag of the first request had been reset, the first request would have been placed at the tail 162_n of the first queue 160 and processed after all of the write requests.

In FIG. 3B, both the first and second queues 160 and 230 are shown. Here, initially the first queue 160 already has a first request that is a read type request at the head 162_1 of the first queue 160. Therefore, the controller 120 sets the head flag of a second request that is a read request and stores the second request at a head 232_1 of the second queue 230. Then, at a time after the first request has left the first queue 160, the storage device 150 may send an acknowledge signal, such as the first type acknowledgment, to the controller 120. In turn, the controller 120 may output the second request from the head 232_1 of the second queue 230 to the first queue 160 of the storage device 150. As the head flag 124 of the second request is set, the storage device 150 places the second request at the head 162_1 of the first queue 160. Thus, the controller 120 prevent read type requests with set head flags from being processed out-of-order at the storage device 150 by holding back a read type request with a set head flag at the device 200 if a read type request is currently at the head 162_1 of the first queue 160 of the storage device 150.

Figure 4:
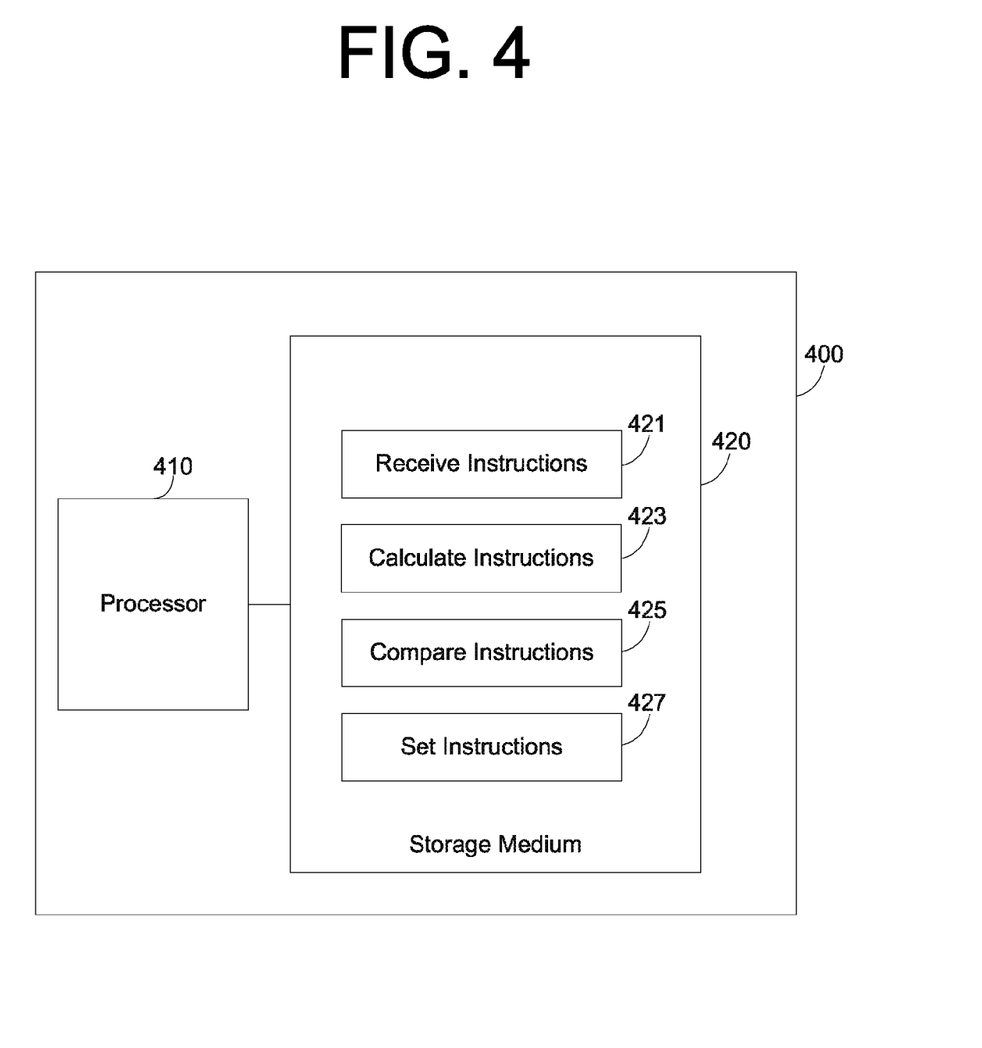
FIG. 4 is an example block diagram of a computing device including instructions for setting a head flag of a request to a storage device.

FIG. 4 is an example block diagram of a computing device 400 including instructions for setting a head flag of a request to a storage device. In the embodiment of FIG. 4, the computing device 400 includes a processor 410 and a machine-readable storage medium 420. The machine-readable storage medium 420 further includes instructions 421, 423, 425 and 427 for setting the head flag of the request to the storage device.

The computing device 400 may be, for example, a secure microprocessor, a notebook computer, a desktop computer, an all-in-one system, a server, a network device, a wireless device, or any other type of user device capable of executing the instructions 421, 423, 425 and 427. In certain examples, the computing device 300 may include or be connected to additional components such as memories, sensors, displays, etc.

The processor 410 may be, at least one central processing unit (CPU), at least one semiconductor-based microprocessor, other hardware devices suitable for retrieval and execution of instructions stored in the machine-readable storage medium 420, or combinations thereof. The processor 410 may fetch, decode, and execute instructions 421, 423, 425 and 427 to implement setting the head flag of the request to the storage device. As an alternative or in addition to retrieving and executing instructions, the processor 410 may include at least one integrated circuit (IC), other control logic, other electronic circuits, or combinations thereof that include a number of electronic components for performing the functionality of instructions 421, 423, 425 and 427.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for setting the head flag of the request to the storage device.

Moreover, the instructions 421, 423, 425 and 427 when executed by a processor (e.g., via one processing element or multiple processing elements of the processor) can cause the processor to perform processes, such as, the process of FIG. 4. For example, the receive instructions 421 may be executed by the processor 410 to receive a request to access a storage device (not shown) from a host (not shown). The calculate instructions 423 may be executed by the processor 410 to calculate a percentage of outstanding requests that are read type requests at a queue of the storage device, if the received request is a read type request.

The compare instructions 425 may be executed by the processor 410 to compare the calculated percentage to a threshold percentage, if the received request is the read type request. The set instructions 427 may be executed by the processor 410 to set a head flag of the request and to output the request to the storage device, if the received request is the read type request and the calculated percentage is less than the threshold percentage. The storage device may store the request at a head of the queue if the head flag of the request is set. The head flag of the request may be reset if the request is not the read type request and/or the calculated percentage is greater than or equal to the threshold percentage. The storage device may store the request at a tail of the queue, if the head flag of the request is reset.

Figure 5:
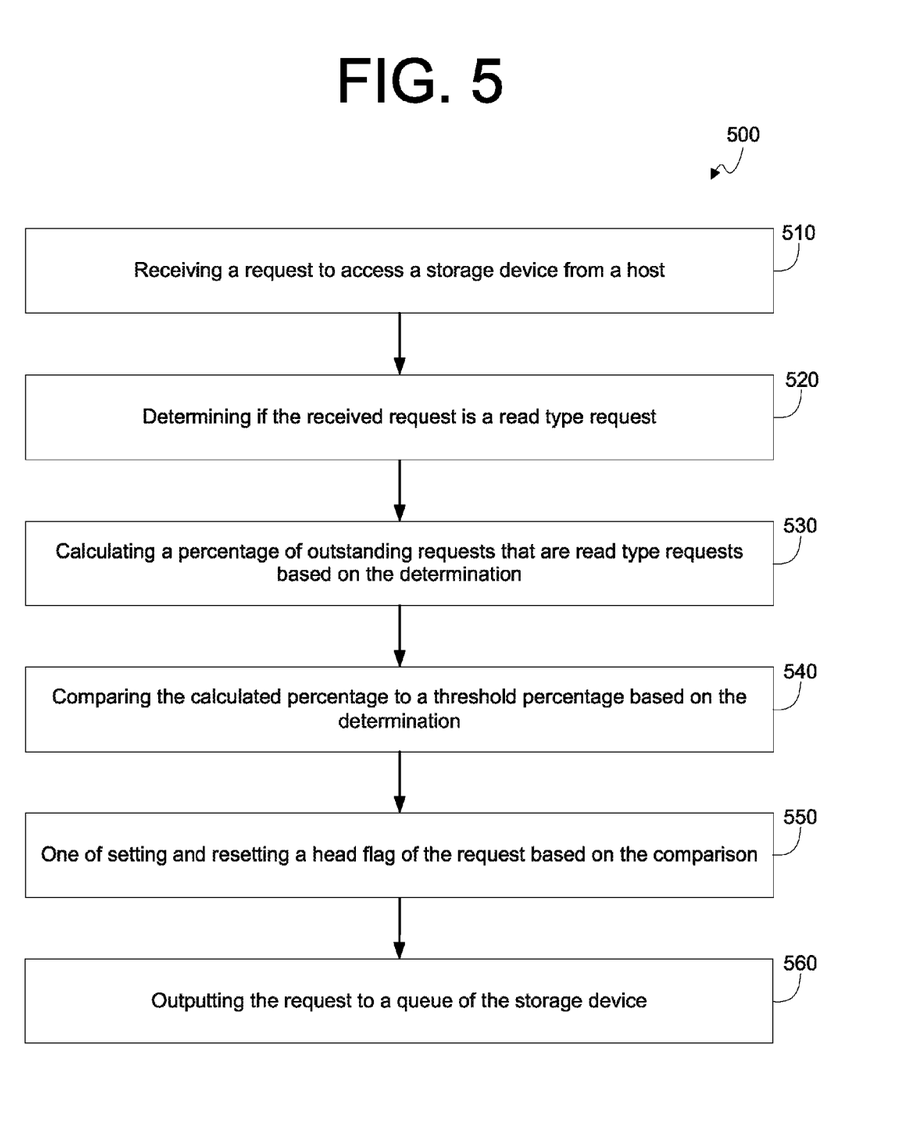
FIG. 5 is an example flowchart of a method for setting a head flag of a request to a storage device.

FIG. 5 is an example flowchart of a method 500 for setting a head flag of a request to a storage device. Although execution of the method 500 is described below with reference to the device 100, other suitable components for execution of the method 500 can be utilized, such as the device 200. Additionally, the components for executing the method 500 may be spread among multiple devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 420, and/or in the form of electronic circuitry.

At block 510, the device 100 receives a request to access a storage device 150 from a host 140. Then, at block 520, the device 100 determines if the received request is a read type request. Next, at block 530, the device 100 calculates a percentage of outstanding requests that are read type requests 126 based on the determination.

At block 540, the device 100 compares the calculated percentage 126 to a threshold percentage 122 based on the determination at block 520. For example, the device 100 may only compare the calculated percentage 126 to the threshold percentage 122 at block 540, if the device 100 determines at block 520 that the received request is the read type request. Thus, the device 100 may not compare the calculated percentage 126 to the threshold percentage 122 if the device 100 determines the received request to not be the read type request, such as a write request.

At block 550, the device 100 sets or resets a head flag 124 of the request based on the comparison at block 540. For example, the device 100 may set the head flag 124 of the request if the comparison at block 540 determines the calculated percentage 126 to be less than the threshold percentage 122. Conversely, the device 100 may reset the head flag 124 of the request if the comparison at block 540 determines the calculated percentage 126 to be greater than or equal to the threshold percentage 122. Further, the device 100 may reset the head flag 124 of the request if the determination at block 520 determines that the received request is not the read type request or the comparison at block 540 does not occur.

Lastly, at block 560, the device 100 outputs the request to a queue 160 of the storage device 150. The storage device 150 is to store the request at a head 162_1 of the queue 160 if the head flag 124 is set. On the other hand, the storage device 150 is to store the request at a tail 162_n or end of the queue 160 if the head flag 124 is reset.

According to the foregoing, examples of present techniques provide a method and/or device for improving read request latency without substantially affecting write request latency. Thus, examples may allow for read requests to be prioritized over write requests when a percentage of the outstanding requests that are read requests is below a threshold percentage.

We claim:

1. A device, comprising:
an interface unit to receive a first request from a host; and
a controller to output the first request to a first queue of a storage device, wherein
the controller is to set a head flag of the first request if the first request is a read type request and percentage of requests queued at the first queue that are read type requests is less than a threshold percentage, and
the storage device is to store the first request at a head of the first queue if the head flag of the first request is set.

2. The device of claim 1, further comprising:
a counter to count a first number of read type requests and a second number of read type and non-read type requests outstanding at the first queue of the storage device, wherein
the percentage is based on the first and second numbers.

3. The device of claim 2, wherein
the counter is to increment the first number if the controller outputs the read type request to the first queue and to increment the second number if the controller outputs at least one of the read type request and the non-read type request to the first queue, and
the counter is to decrement the first number if the storage device outputs a first type acknowledgment to the device to indicate that the read type request has left the first queue and to decrement the second number if the storage device outputs at least one of the first type acknowledgement and a second type acknowledgment to the device, the second type acknowledgment to indicate that the non-read type request has left the first queue.

4. The device of claim 1, wherein,
the controller is to reset the head flag of the first request if the percentage of requests queued at the first queue that are read type requests is greater than or equal to the threshold percentage, and
the storage device is to store the first request at a tail of the first queue if the head flag of the first request is reset.

5. The device of claim 1, further comprising:
a second queue to output to the storage device, wherein
the controller is to receive a second request from the host, and
the controller is to output the second request to a tail of the second queue if the second request is not a read type request and the first queue has capacity to store only one additional request.

6. The device of claim 5, wherein,
the controller is to reset a head flag of the second request and to output the second request to the second queue if the second request is a read type request, the percentage of requests queued at the first queue that are read type requests is greater than or equal to the threshold percentage and the first queue has capacity to store only one additional request and the storage device is to store the second request a tail of the first queue if the head flag of the second request is reset.

7. The device of claim 5, wherein, the controller is to set a head flag of the second request and to output the second request to a head of the second queue if the second request is the read type request and the head of the first queue holds the first request that is the read type request, the controller is to output the second request to the storage device after the first request is output from the head of the first queue of the storage device, if the percentage of requests queued at the first queue that are read type requests is less than the threshold percentage, and the storage device is to store the second request at a head of the first queue if the head flag of the second request is set.

8. The device of claim 1, wherein the controller is to reset the head flag of the first request, if the first request is not the read type request, and the storage device is to store the second request at a tail of the first queue if the head flag of the second request is reset.

9. A method, comprising:

receiving a request to access a storage device from a host;

determining if the received request is a read type request;

calculating a percentage of outstanding requests that are read type requests based on the determination;

comparing the calculated percentage to a threshold percentage based on the determination;

one of setting and resetting a head flag of the request based on the comparison; and outputting the request to a queue of the storage device, wherein the storage device is to store the request at a head of the queue if the head flag is set.

10. The method of claim 9, wherein the comparing compares the calculated percentage to the threshold percentage if the determining determines the received request to be the read type request.

11. The method of claim 10, wherein, the comparing does not compare the calculated percentage to the threshold percentage if the determining determines the received request to not be the read type request, the head flag of the request is reset if the determining determines the received request is not the read type request, and the storage device is to store the request at a tail of the queue if the head flag is reset.

12. The method of claim 9, wherein, the head flag of the request is set if the comparison determines the calculated percentage to he less than the threshold percentage, and the storage device is to store the request at a tail of the queue if the head flag is reset.

13. The method of claim 12, wherein, the head flag of the request is reset if the comparison determines the calculated percentage to be greater than or equal to the threshold percentage, and the storage device is to store the request at the head of the queue if the head flag is set.

14. A non-transitory machine-readable storage medium storing instructions that, if executed by a processor of a device, cause the processor to:

receive a request to access a storage device from a host;

calculate a percentage of outstanding requests that are read type requests at a queue of the storage device, if the received request is a read type request;

compare the calculated percentage to a threshold percentage, if the e received request is the read type request; and set a head flag of the request and output the request to the storage device, if the received request is the read type request and the calculated percentage is less than the threshold percentage, wherein the storage device is to store the request at a head of the queue, if the head flag of the request is set.

15. The non-transitory machine-readable storage medium of claim 14, wherein, the head flag of the request is reset if at least one of the request is not the read type request and the calculated percentage is greater than equal to the threshold percentage, and the storage device is to store the request at a tail of the queue if the head flag of the request is reset.

* * * * *

UNITED STATES PATENT AND TRADEMARK OFFICE
CERTIFICATE OF CORRECTION

| | | |
|---|---|---|
| PATENT NO. | : 9,134,910 B2 | Page 1 of 1 |
| APPLICATION NO. | : 13/874344 | |
| DATED | : September 15, 2015 | |
| INVENTOR(S) | : Mark J. Thompson et al. | |

It is certified that error appears in the above-identified patent and that said Letters Patent is hereby corrected as shown below:

In the claims

In column 8, line 25, in Claim 1, delete "and" and insert -- and a --, therefor.

In column 9, line 6, in Claim 6, delete "request a" and insert -- request at a --, therefor.

In column 10, line 13 approx., in Claim 12, delete "he" and insert -- be --, therefor.

In column 10, line 40 approx., in Claim 15, delete "than equal" and insert -- than or equal --, therefor.

Signed and Sealed this
Eighth Day of March, 2016

Michelle K. Lee
*Director of the United States Patent and Trademark Office*